(12) United States Patent
Sawai et al.

(10) Patent No.: US 8,022,000 B2
(45) Date of Patent: Sep. 20, 2011

(54) DISPLAY DEVICE AND PRODUCTION METHOD THEREOF

(75) Inventors: Yuichi Sawai, Mito (JP); Osamu Shiono, Hitachi (JP); Takashi Namekawa, Hitachi (JP); Hiroyuki Akata, Hitachi (JP); Takashi Naito, Funabashi (JP); Keiichi Kanazawa, Ome (JP); Yuuichi Kijima, Chosei (JP); Shigemi Hirasawa, Chiba (JP); Shunichi Asakura, Sakae (JP); Mitsuo Hayashibara, Hitachinaka (JP)

(73) Assignee: Hitachi Displays Ltd., Chiba (JP)

( * ) Notice: Subject to any disclaimer, the term of this patent is extended or adjusted under 35 U.S.C. 154(b) by 1262 days.

(21) Appl. No.: 11/620,107

(22) Filed: Jan. 5, 2007

(65) Prior Publication Data

US 2007/0158021 A1 Jul. 12, 2007

(30) Foreign Application Priority Data

Jan. 6, 2006 (JP) .................. 2006-001303
Feb. 16, 2006 (JP) .................. 2006-038782

(51) Int. Cl.
*C03C 8/02* (2006.01)
*C03C 8/14* (2006.01)
*C03C 8/00* (2006.01)
*C03C 3/12* (2006.01)

(52) U.S. Cl. ............... 501/21; 501/14; 501/15; 501/17; 501/18; 501/26; 501/41; 501/46

(58) Field of Classification Search .............. 501/14, 501/15, 17, 18, 21, 26, 41, 46
See application file for complete search history.

(56) References Cited

U.S. PATENT DOCUMENTS

| | | | | | |
|---|---|---|---|---|---|
| 4,743,302 | A | * | 5/1988 | Dumesnil et al. | 106/1.23 |
| 5,013,360 | A | * | 5/1991 | Finkelstein et al. | 106/1.23 |
| 5,051,381 | A | * | 9/1991 | Ohji et al. | 501/26 |
| 5,188,990 | A | * | 2/1993 | Dumesnil et al. | 501/19 |
| 5,336,644 | A | * | 8/1994 | Akhtar et al. | 501/15 |
| 7,425,518 | B2 | * | 9/2008 | Yoshida et al. | 501/15 |
| 7,452,489 | B2 | * | 11/2008 | Sawai et al. | 252/520.4 |
| 7,585,798 | B2 | * | 9/2009 | Yoshida et al. | 501/15 |
| 2007/0159056 | A1 | * | 7/2007 | Sawai et al. | 313/495 |
| 2007/0286973 | A1 | * | 12/2007 | Sawai et al. | 428/34.4 |
| 2008/0238315 | A1 | * | 10/2008 | Hojo et al. | 313/582 |
| 2008/0238316 | A1 | * | 10/2008 | Hayashibara et al. | 313/582 |
| 2009/0199897 | A1 | * | 8/2009 | Naito et al. | 136/256 |

FOREIGN PATENT DOCUMENTS

| | | | |
|---|---|---|---|
| JP | 06263478 A * | 9/1994 | |
| JP | 07-065710 | 3/1995 | |
| JP | 08-022782 | 1/1996 | |
| JP | 09-283059 | 10/1997 | |
| JP | 10-153979 | 6/1998 | |
| JP | 2000-021335 | 1/2000 | |
| JP | 2003-192378 | 7/2003 | |
| JP | 2004-250276 | 9/2004 | |
| JP | 2004356394 A * | 12/2004 | |
| JP | 2004356395 A * | 12/2004 | |
| JP | 2000-206905 | 7/2005 | |
| JP | 2006342044 A * | 12/2006 | |
| SU | 1497168 A * | 7/1989 | |
| SU | 1497169 A * | 7/1989 | |
| WO | WO 9302980 A1 * | 2/1993 | |
| WO | WO 2004074198 A1 * | 9/2004 | |
| WO | WO 2005000755 A1 * | 1/2005 | |
| WO | WO 2010016318 A1 * | 2/2010 | |

* cited by examiner

*Primary Examiner* — Karl E Group
*Assistant Examiner* — Elizabeth A Bolden
(74) *Attorney, Agent, or Firm* — Antonelli, Terry, Stout & Kraus, LLP.

(57) ABSTRACT

A bonding glass containing $V_2O_5$: 25 to 50 wt %, $TeO_2$: 20 to 40 wt % and BaO: 5 to 30 wt %, and not containing lead.

8 Claims, 8 Drawing Sheets

FIG. 1
(a)
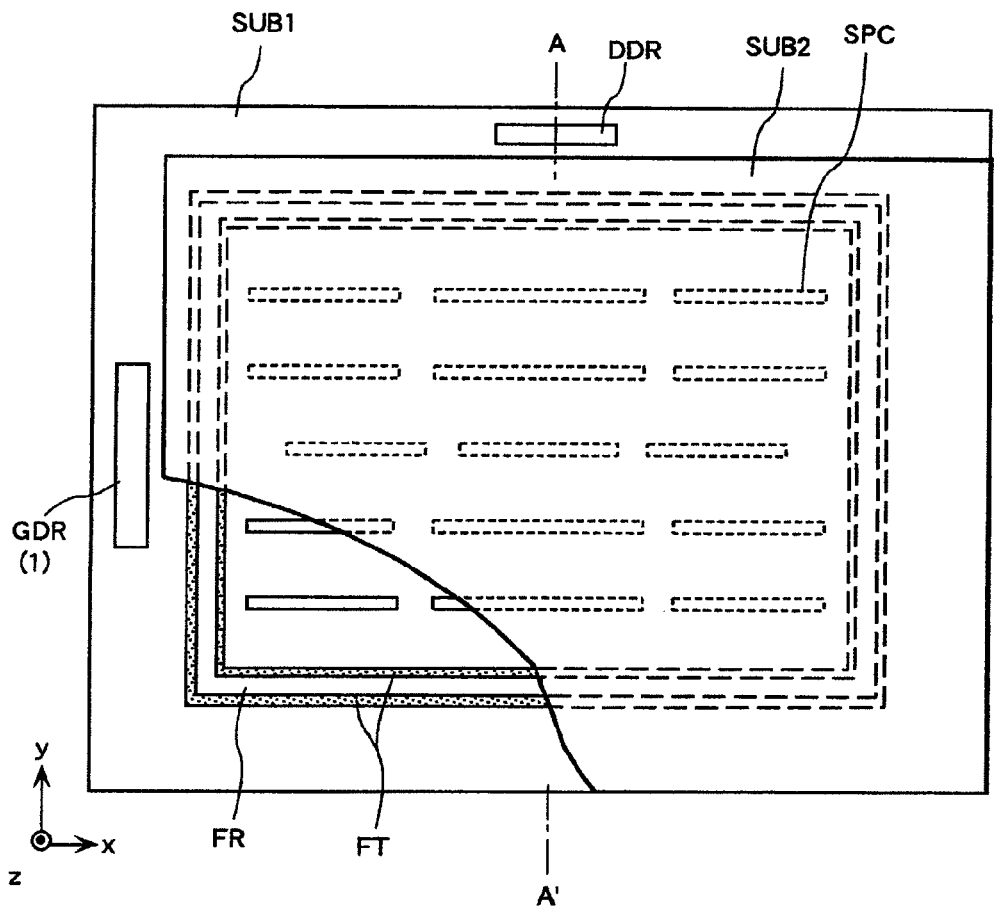
(b)
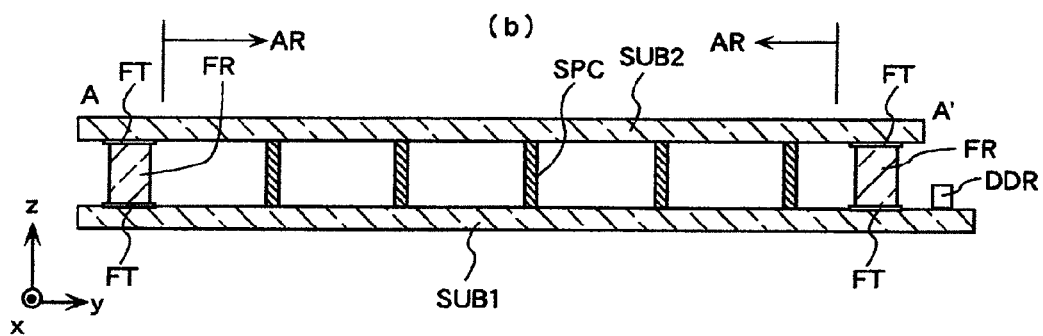

FIG. 6

| No. | GLASS COMPOSITION | | | | | | THERMAL EXPANSION COEFFICIENT (×10^-7/°C) COEFFICIENT EVALUTION | | | DTA EVALUATED CHARACTERISTIC TEMPERATURE (°C) | | | | | DENSITY (g/cm³) | ELECTRIC RESISTIVITY (MΩcm³) | BUTTON FLOW FLUID DIAMETER (mm) | | |
|---|---|---|---|---|---|---|---|---|---|---|---|---|---|---|---|---|---|---|---|
| | V2O5 | BaO | TeO2 | WO3 | P2O5 | ZnO | | Tg | Mg | Tg | Mg | Ts | Tf | Tw | | | 360°C | 410°C | 430°C |
| VTW01 | 45 | 20 | 35 | 0 | 0 | | 159.1 | 268.0 | 282.8 | 270.0 | 285.0 | 310.0 | 360.0 | - | 4.2 | 213 OR MORE | 11.9 | 16.4 | 17.1 |
| VTW02 | 39 | 17 | 30 | 0 | 13 | | 124.5 | 324.2 | 349.9 | 325.0 | 345.0 | 385.0 | 460.0 | - | 3.9 | 16.0 | 10.0 | 9.1 | 10.8 |
| VTW03 | 35 | 15 | 27 | 0 | 23 | | 112.6 | 368.4 | 401.6 | 365.0 | 390.0 | 440.0 | - | - | 3.8 | 6.4 | 10.1 | 10.0 | 9.3 |
| VTW04 | 39 | 17 | 30 | 13 | 0 | | 145.2 | 278.4 | 297.7 | 285.0 | 295.0 | 330.0 | 385.0 | - | 4.4 | 106.7 | 10.6 | 19.7 | 19.1 |
| VTW05 | 35 | 15 | 27 | 12 | 12 | | 114.9 | 354.9 | 384.8 | 325.0 | 345.0 | 390.0 | 450.0 | - | 3.7 | 23.5 | 9.9 | 9.3 | 11.1 |
| VTW06 | 31 | 14 | 24 | 10 | 21 | | 121.3 | 324.2 | 353.0 | 355.0 | 380.0 | 435.0 | 550.0 | - | 4.1 | 12.8 | 10.1 | 9.7 | 9.0 |
| VTW07 | 35 | 15 | 27 | 23 | 0 | | 133.9 | 289.0 | 305.7 | 295.0 | 310.0 | 445.0 | - | - | 4.6 | 21.3 | 9.0 | 11.1 | 11.3 |
| VTW08 | 31 | 14 | 24 | 21 | 10 | | 123.6 | 313.2 | 336.9 | 315.0 | 345.0 | 385.0 | 445.0 | - | 4.3 | 85.3 | 10.0 | 9.4 | 11.2 |
| VTW09 | 28 | 13 | 22 | 19 | 19 | | 109.9 | 363.3 | 402.5 | 365.0 | 390.0 | 460.0 | 525.0 | - | 4.1 | 19.2 | 10.0 | 10.0 | 9.8 |
| VBW01 | 33 | 17 | 30 | 15 | | 5 | 141.5 | 291.9 | 314.3 | 300.0 | 315.0 | 365.0 | 445.0 | - | 4.6 | 213 OR MORE | 12.0 | 15.1 | 18.1 |
| VBW02 | 38 | 17 | 30 | 10 | | 5 | 108.1 | 353.7 | 385.5 | 290.0 | 300.0 | 355.0 | 440.0 | - | 4.4 | 213 OR MORE | 14.6 | 18.2 | 21.9 |
| VBW03 | 43 | 17 | 30 | 5 | | 5 | 139.4 | 267.3 | 285.8 | 275.0 | 290.0 | 335.0 | 405.0 | - | 4.0 | 213 OR MORE | 16.4 | 20.5 | 24.6 |
| VBW04 | 28 | 17 | 30 | 20 | | 5 | 110.3 | 340.7 | 369.4 | 302.5 | 319.0 | 368.5 | 445.5 | - | 4.5 | 213 OR MORE | 13.2 | 16.5 | 19.9 |
| VBW05 | 38 | 22 | 25 | 10 | | 5 | 116.4 | 311.2 | 338.9 | 300.0 | 315.0 | 365.0 | 450.0 | - | 4.4 | 213 OR MORE | 11.8 | 14.7 | 17.7 |
| VBW06 | 38 | 27 | 20 | 10 | | 5 | 128.5 | 277.4 | 293.5 | 310.0 | 325.0 | 375.0 | - | - | 4.4 | 213 OR MORE | 8.7 | 10.8 | 13.0 |
| VBW07 | 38 | 32 | 15 | 10 | | 5 | 118.7 | 300.7 | 323.4 | 315.0 | 330.8 | 383.3 | 472.5 | - | 4.6 | 213 OR MORE | 9.8 | 12.3 | 14.8 |

FIG. 6'

| SAMPLE NAME | COMPOSITION (WEIGHT %) | | | | THERMAL CHARACTERISTIC | | | ADHESIVENESS |
|---|---|---|---|---|---|---|---|---|
| | V2O5 | P2O5 | BaO | Sb2O3 | α(250°C) | Tg | Mg | |
| SST-01 | 45 | 15 | 15 | 25 | 82.0 | 340.00 | 355.00 | ○ |
| SST-02 | 45 | 20 | 25 | 10 | 81.3 | 362.50 | 382.50 | ○ |
| SST-03 | 45 | 25 | 10 | 20 | 74.5 | 376.00 | 401.00 | ○ |
| SST-04 | 50 | 10 | 8 | 32 | 89.9 | 280.00 | 290.00 | ○ |
| SST-05 | 50 | 15 | 8 | 27 | 81.6 | 330.00 | 345.00 | ○ |
| SST-06 | 50 | 15 | 27 | 8 | 87.3 | 330.00 | 345.00 | ○ |
| SST-07 | 50 | 20 | 5 | 25 | 76.5 | 355.00 | 375.00 | ○ |
| SST-08 | 50 | 20 | 25 | 5 | 82.5 | 355.00 | 375.00 | ○ |
| SST-09 | 50 | 25 | 5 | 20 | 74.0 | 370.00 | 395.00 | ○ |
| SST-10 | 50 | 25 | 10 | 15 | 75.5 | 370.00 | 395.00 | ○ |
| SST-11 | 50 | 20 | 15 | 15 | 79.5 | 355.00 | 375.00 | ○ |
| SST-12 | 25 | 25 | 20 | 30 | 94.5 | 265.00 | 275.00 | ○ |
| SST-13 | 30 | 25 | 15 | 30 | 82.3 | 320.00 | 335.00 | ○ |
| SST-14 | 30 | 25 | 35 | 10 | 88.3 | 320.00 | 335.00 | ○ |
| SST-15 | 35 | 25 | 15 | 25 | 77.8 | 347.50 | 367.50 | ○ |
| SST-16 | 50 | 20 | 20 | 10 | 82.3 | 347.50 | 367.50 | ○ |
| SST-17 | 40 | 25 | 15 | 20 | 74.7 | 364.00 | 389.00 | ○ |
| SST-18 | 45 | 35 | 10 | 10 | 76.5 | 364.00 | 389.00 | ○ |
| SST-19 | 35 | 30 | 20 | 15 | 79.3 | 347.50 | 367.50 | ○ |
| SST-20 | 35 | 25 | 20 | 20 | 97.0 | 250.00 | 260.00 | ○ |
| SST-21 | 50 | 25 | 5 | 20 | 84.0 | 310.00 | 325.00 | ○ |
| SST-22 | 45 | 20 | 20 | 15 | 88.5 | 310.00 | 325.00 | ○ |
| SST-23 | 40 | 20 | 20 | 20 | 78.7 | 340.00 | 360.00 | ○ |
| SST-24 | 45 | 20 | 20 | 15 | 82.3 | 340.00 | 360.00 | ○ |
| SST-25 | 60 | 25 | 3 | 12 | 75.4 | 358.00 | 383.00 | × |
| SST-26 | 60 | 25 | 10 | 5 | 77.5 | 358.00 | 383.00 | × |
| SST-27 | 60 | 20 | 10 | 10 | 80.5 | 340.00 | 360.00 | × |
| SST-28 | 65 | 15 | 4 | 16 | 85.4 | 300.00 | 315.00 | × |
| SST-29 | 65 | 20 | 3 | 12 | 79.7 | 332.50 | 352.50 | × |
| SST-30 | 65 | 25 | 2 | 8 | 76.1 | 352.00 | 377.00 | × |

| SAMPLE NAME | THERMAL EXPANSION COEFFICIENT EVALUTION | DTA EVALUATED CHARACTERISTIC TEMPERATURE (°C) | | | | | | BUTTON FLOW FLUID DIAMETER (mm) | | |
|---|---|---|---|---|---|---|---|---|---|---|
| | THERMAL EXPANSION COEFFICIENT ($\times 10^{-7}$/°C) | Tg | Mg | Tg | Mg | Ts | Tf | 370°C | 410°C | 430°C |
| VBWO3 | 143.5 | 273 | 288 | 275 | 290 | 335 | 405 | 16.8 | 20.47 | 23.5 |
| VBWO3+20%ZWP | 88.65 | 294.9 | 314.9 | 275 | 290 | 335 | 385 | 9.58 | 16.98 | 20.94 |
| VBWO3+30%ZWP | 74.39 | 290.2 | 313 | 275 | 290 | 335 | 405 | 9.97 | 14.12 | 16.4 |
| VBWO3+40%ZWP | 62.07 | 276.9 | 294.5 | 275 | 290 | 330 | 415 | 10.03 | 12.26 | 13.83 |

DISPLAY DEVICE AND PRODUCTION METHOD THEREOF

FIELD OF THE INVENTION

The present invention relates to display devices and production methods thereof, and is suitable in particular for flat panel type display devices whose interior is an airtight container.

BACKGROUND OF THE INVENTION

As display devices excellent in high brightness and high definition, liquid crystal display devices, plasma display devices, and the like are put in practical use in place of conventional color cathode ray tubes. Moreover, among others, as those allowing for higher brightness, various types of panel type display devices such as an electron emission type display device, an organic electroluminescence display device characterized in low power dissipation, and the like, are put in practical use or are in preliminary stages for practical use.

Patent documents related to the electron emission type display device include Patent Document 1 (JP-A-9-283059), Patent Document 2 (JP-A-2000-21335), Patent Document 3 (JP-A-8-22782), etc. In this type of display device, a back panel in which a plurality of thin film type electron sources are formed in the inner surface of a first glass substrate, and a front panel in which an anode and a fluorescent substance are formed in the inner surface of a second glass substrate, the inner surface of the second glass substrate being opposite to an electron source forming surface of the first glass substrate, are oppositely arranged at a predetermined interval, and the first glass substrate constituting the back panel and the second glass substrate constituting the front panel are bonded together at an outer peripheral inner edge via a sealing frame that is preferably made of glass, thereby constituting an airtight container (also referred to as a vacuum container, in this case).
(Patent Document 1) JP-A-9-283059
(Patent Document 2) JP-A-2000-21335
(Patent Document 3) JP-A-8-22782

BRIEF SUMMARY OF THE INVENTION

In constituting an airtight container by bonding the first glass substrate constituting the back panel and a second glass substrate constituting the front panel at the outer peripheral inner edge via the sealing frame, an adhesive layer (seal frit glass) made of glass as the main ingredient is applied and dried to the bonding portions between the sealing frame and the first glass substrate and between the sealing frame and the second glass substrate. This is put into a baking furnace, and is vacuum pumped while heating in the furnace. At this time, the adhesive layer melts and hermetically bonds (seals) between the sealing frame and the first glass substrate and between the sealing frame and the second glass substrate. This is taken out of the furnace and is returned to normal temperature, so that the adhesive layer adheres. In this way, an airtight container whose interior is at a predetermined degree of vacuum is formed. Moreover, after adhering by heating at ordinary pressure in the atmosphere, re-heating and vacuum pumping may be carried out.

In melting the adhesive layer and sealing while vacuum pumping, the melted adhesive layer is drawn to the inside of the airtight container by a negative pressure of the vacuum pumping. Because a certain level of compressive force due to the negative pressure in the airtight container acts on the bonding areas between the sealing frame and the first glass substrate and between the sealing frame and the second glass substrate, there is a certain level of drag force against the above-described drawing of the adhesive layer existing in between the bonding areas, the drawing to the inside of the airtight container. However, if this drawing of the adhesive layer occurred, the adhesive layer will not remain sufficiently in the adhesion surface and thus a required adhesive strength will not be obtained. Moreover, leak may occur and decrease the degree of vacuum. As a result, the reliability and yield of the display device will decrease.

An object of the present invention is to provide highly reliable display devices by preventing the adhesive layer from being drawn to the inside at the time of vacuum pumping and fixing, and thereby securing a sufficient adhesive strength.

A display device of the present invention includes a first glass substrate; a second glass substrate bonded to the first glass substrate at a predetermined interval; and a sealing frame which is fixed, via an adhesive layer, around an bonding inner edge of the first glass substrate and the second glass substrate, the sealing frame constituting an airtight container together with the both substrates. The adhesive layer is interposed between the sealing frame and the first glass substrate and between the sealing frame and the second glass substrate, and the surface of the adhesive layer facing to the inside of the airtight container is caused to have a crystalline layer originating from the adhesive layer. Although the present invention is suitable for display devices which maintain the interior of the airtight container in vacuum atmosphere or decompressed atmosphere, it is also applicable to display devices designed to seal a gas therein.

According to the present invention, it is particularly preferable to have a crystalline layer in the surface of the adhesive layer on the inner surface side of the vacuum container, because it is effective in maintaining the degree of vacuum.

Moreover, the present invention allows the adhesive layer to cover the whole surface of the sealing frame, and also allows the surface of the adhesive layer facing to the outside of the airtight container to have a crystalline layer originating from the adhesive layer. If the adhesive layer remains adhered in a glassy state, it may degrade due to the affect of moisture in the atmosphere, resulting in reduction in strength. The formation of the crystalline layer may reduce this degradation. Accordingly, the present invention is effective in causing the adhesive layer to cover the whole surface of the sealing frame, and in forming this layer also in the outer surface. Moreover, it is also possible to have the crystalline layer originating from the adhesive layer in the surface of the adhesive layer facing to the outside of the airtight container, the outside being less likely to be affected by the drawing. The adhesive interface between the adhesive layer and the substrate or the sealing frame will not crystallize because it is not heated under vacuum condition or reduction atmosphere. As a result, the adhesiveness of the bonding portion is maintained.

Moreover, more specifically, according to the present invention, the first glass substrate is a back panel in which a plurality of electron sources are formed, and the second glass substrate is a front panel in which a fluorescent surface is formed. A spacer is erected between the opposing inner surfaces of the front panel and the back panel to maintain the gap between the both panels at a predetermined value. The sealing frame going around the bonding inner edge of the front panel and the back panel is fixed by the adhesive layer to thereby constitute an airtight container together with the both panels, the airtight container being in vacuum atmosphere or decompressed atmosphere. It is possible to have the crystalline layer originating from the adhesive layer at least in the surface of this adhesive layer facing to the airtight container.

Bonding glass which easily crystallizes and which is readily used for the present invention described above has a composition of, for example, $V_2O_5$: 55 to 60 wt %, $P_2O_5$: 20 to 25 wt %, BaO: 5 to 10 wt %, $Sb_2O_3$: 5 to 10 wt %, $TeO_2$: 0 to 5 wt %, $WO_3$: 0 to 5 wt %, and ZnO: 0 to 5 wt % in oxide conversion. For glass which will not easily crystallize, the precipitation of a crystalline layer is facilitated by turning a heating atmosphere into an oxygen-free high vacuum atmosphere. Although the thickness of the crystalline layer may be changed in accordance with the degree of vacuum, 1 μm or more is preferable. Moreover, a crystalline layer with a thickness exceeding approximately 10 μm is difficult to prepare because the crystallization progresses from the surface.

Other objects, features and advantages of the invention will become apparent from the following description of the embodiments of the invention taken in conjunction with the accompanying drawings.

BRIEF DESCRIPTION OF THE DRAWINGS

FIG. 1 is a view explaining an example of the overall structure of a display device concerning the present invention.

FIG. 6 is a view explaining the composition and characteristic table of $V_2O_5$—$TeO_2$—$WO_3$—$P_2O_5$ system sealing glass and $V_2O_5$—$TeO_2$—$WO_3$—ZnO system sealing glass.

FIG. 6' is a view explaining the composition of $V_2O_5$ system glass according to the present invention.

DESCRIPTION OF REFERENCE NUMERALS

Figure 2:
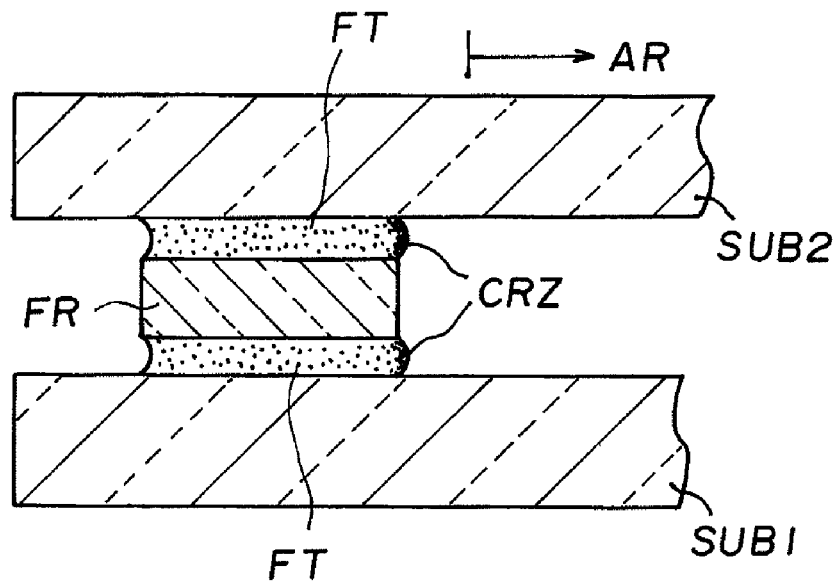
FIG. 2 is a cross sectional view of a principal part explaining Example 1 of a display device according to the present invention.

SUB1 First glass substrate (back substrate), SUB2 Second glass substrate (front substrate), FR Sealing frame, FT Adhesive layer, SPC Spacer

DETAILED DESCRIPTION OF THE INVENTION

Hereinafter, the best mode embodiment of the present invention is described in detail with reference to the accompanying drawings.

FIG. 1 is a view explaining an example of the overall structure of a display device concerning the present invention. This display device is an electron emission type display device, wherein a back panel, in which a thin film electron source is formed in a first glass substrate SUB1, and a front panel, in which a fluorescent substance and an anode are formed in a second glass substrate SUB2, are integrated with a sealing frame FR to form an airtight container. FIG. 1 (a) shows a top view seen from the front panel (first glass substrate) side, and FIG. 1 (b) shows a cross sectional view cut along the A-A' line of FIG. 1 (a), respectively.

This display device is constituted causing the back panel and the front panel to face to each other at a predetermined interval. The back panel has the first glass substrate SUB1 in which a number of electron emission sources (hereinafter, referred to also as cathodes) are formed in the inner surface, and the front panel has the translucent second glass substrate SUB2, in which a plurality of colored fluorescent substances and anodes are formed in an inner surface facing to a cathode forming surface of the first glass substrate SUB1, the plurality of colored fluorescent substances and anodes being defined to each other by a black matrix film.

The first glass substrate SUB1 and the second glass substrate SUB2 are opposingly disposed at a predetermined interval via a spacing member (spacer SPC). An adhesive layer (seal frit glass) FT is applied to the inner peripheral edges of the first glass substrate SUB1 and the second glass substrate SUB2, and a sealing glass frame FR is interposed therebetween, and these are baked and fixed to form an airtight container. The interior of this airtight container is vacuum pumped through a non-illustrated exhaust pipe. In addition, reference numeral AR represents the display region.

For the adhesive layer (seal frit glass) FT for adhering the sealing frame FR, a glass paste with viscosity of approximately 100 Pa-s or more, in which glass powder of an average grain diameter in the range from 3 μm to 10 μm is pasted together with a binder of a predetermined viscosity and solvent, is applied by a screen printing method, a dispensing method, or a coater batch-coating method and is dried, and thereafter it is baked and melted at 400° C. to 450° C. to disperse the solvent, and thereby the back substrate SUB1 and the front substrate SUB2 are integrally fixed by the sealing frame FR. This fixing is due to melting and adhering of the adhesive layer FT.

In this display device, a signal line (data line) (or a drain line in a picture element formed by a thin-film transistor) extends in the y direction (in the vertical direction of FIG. 1 (a)) and a large number of signal lines are disposed in parallel in the x direction (in the horizontal direction of FIG. 1 (a)). Moreover, a scanning line (or a gate line in a picture element formed by a thin-film transistor) extends in the x direction which intersects with this signal line and a large number of scanning lines are disposed in parallel in the y direction. A driving signal to the scanning line is applied from a scanning line driving circuit (gate driver) GDR mounted in the left side of FIG. 1 (a). The signal line is driven by a signal line driving circuit (data driver) DDR mounted in the upper side of FIG. 1 (a).

As shown in FIG. 1 (b), the spacer SPC preferably made of a thin plate glass material is erected so that the width direction thereof may be in the z direction along the longitudinal direction of the scanning line above the scanning line to maintain the gap between the first glass substrate SUB1 and the second glass substrate SUB2 at a predetermined value. Although in FIG. 1 (a) four spacers SPC are disposed along the longitudinal direction of each scanning line, this is just an example, and the number of arrangement, the gap, and the like are determined by the size of the display surface of the image display device, the material of the first glass substrate SUB1 and the second glass substrate SUB2, the plate thickness thereof, the resolution, and the like.

For the melting and solidification of the adhesive layer FT, a provisional fixing is carried out by interposing, between the first glass substrate SUB1 and the second glass substrate SUB2, the sealing frame FR to which the adhesive layer FT is applied. This is put into a baking furnace to melt the adhesive layer FT while vacuum pumping the interior through an exhaust pipe, and then the exhaust pipe is sealed off in the state where the interior is in a predetermined degree of vacuum, thereby obtaining an airtight container whose interior is vacuumed or decompressed.

Example 1

FIG. 2 is a cross sectional view of a principal part explaining Example 1 of a display device according to the present invention. In FIG. 2, the adhesive layer FT is applied to between the respective contact surfaces of the first glass substrate SUB1 and sealing frame FR, as well as of the second glass substrate SUB2 and sealing frame FR. In Example 1, a crystalline layer CRZ is provided in the surface of the adhesive layer FT facing to the interior on a display region AR side. The layer thickness of this crystalline layer CRZ is approximately 10 μm.

The assembly is carried out so that the first glass substrate SUB1, the second glass substrate SUB2, and the sealing frame FR may provide an airtight container. In this airtight container, the sealing frame FR to which the adhesive layer FT is applied is interposed between the first glass substrate SUB1 and the second glass substrate SUB2, and the interior on the display region AR side is vacuum pumped while heating. Nonlead glass containing vanadium is suitable for this adhesive layer FT, and a filler for adjusting the flowability and thermal expansion coefficient is mixed therein.

In this vacuum pumping, the assembled airtight container is put in a baking furnace and is heated to melt the adhesive layer FT. Then, by making the atmosphere inside the airtight container reductive (hypoxia concentration) adheres, when the adhesive layer FT melts the inner surface of the container will crystallize to form the crystalline layer CRZ. That is, in Example 1, before vacuum pumping from the exhaust pipe, the internal atmosphere of the airtight container is replaced with a reducing gas (e.g., 1% $H_2$ in $N_2$) to provide a hypoxic concentration atmosphere. Heating in this state melts the adhesive layer FT. Then, this heating is stopped. When the adhesive layer FT solidifies, the crystalline layer CRZ is formed in the surface.

Subsequently, the interior of the airtight container is exhausted through the exhaust pipe while heating again. In this reheating, although the adhesive layer FT melts as a whole, the crystalline layer CRZ in the surface will remain crystallized. For this reason, the melted portion of the adhesive layer FT will not be drawn to the inside of the airtight container that is to be decompressed. Accordingly, the sufficient adhesive layer FT is interposed in the opposing surfaces between the first glass substrate SUB1 and the sealing frame FR as well as between the second glass substrate SUB2 and the sealing frame FR to thereby provide a rigid airtight container.

In addition, in the first heating, the crystalline layer may be formed also in the outer surface of the adhesive layer FT by turning the atmosphere of the whole interior of the baking furnace into a reducing gas. Accordingly, a decrease in adhesive strength due to the degradation of the adhesive layer by the affect of moisture outside the airtight container is suppressed, thereby allowing a highly reliable display device to be provided. This crystallization increases the degree of hardness of the surface and improves resistance against an impact. Moreover, as described above, by crystallizing only a portion in contact with the reducing gas, a portion for obtaining the crystalline layer may be selected suitably. The crystalline layer is less likely to be formed in the interface between the sealing frame and the adhesive layer, the interface not being in contact with the reduction atmosphere. As a result, a decrease in adhesive strength due to the crystalline layer is less likely to occur. Moreover, there is an advantage that the whole distortion due to the varying degree of crystallinity, breaking due to differences in thermal expansion coefficient for each portion, or the like, are less likely to occur because only the surface layer turns into the crystalline layer and crystal will not precipitate thereinside.

Example 2

Figure 3:
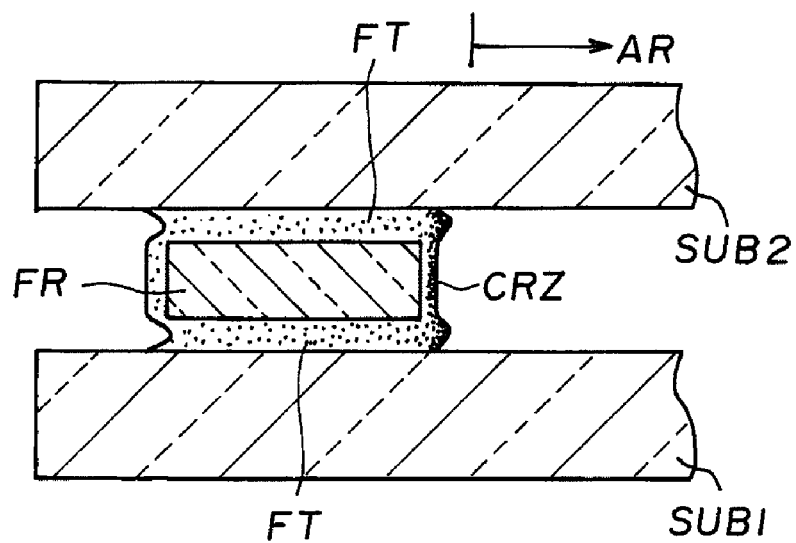
FIG. 3 is a cross sectional view of a principal part explaining Example 2 of a display device according to the present invention.

FIG. 3 is a cross sectional view of a principal part explaining Example 2 of a display device according to the present invention. In FIG. 3, the adhesive layer FT is applied to the whole surface including between the respective contact surfaces of the first glass substrate SUB1 and the sealing frame FR, as well as of the second glass substrate SUB2 and the sealing frame FR, and the side surfaces. In Example 2, the crystalline layer CRZ is provided in the surface of the adhesive layer FT facing to the interior on the display region AR side. Other structures are the same as those of Example 1. Then, the processes of heating, reheating, and vacuum pumping the airtight container are the same as those of Example 1.

Then, also in Example 2, in the first heating, the crystalline layer may be formed also in the outer surface of the adhesive layer FT by making the atmosphere of the whole interior of the baking furnace reductive. Accordingly, a decrease in adhesive strength due to the degradation of the adhesive layer by the affect of moisture outside the airtight container is suppressed, thereby allowing a highly reliable display device to be provided.

Example 3

Figure 4:
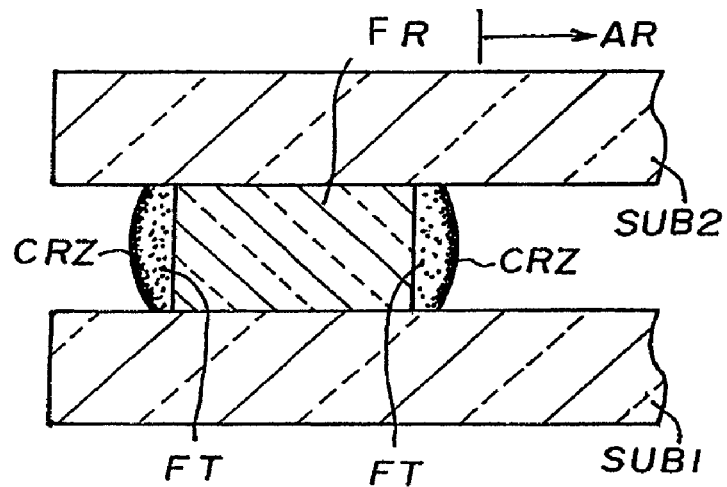
FIG. 4 is a cross sectional view of a principal part explaining Example 3 of a display device according to the present invention.

FIG. 4 is a cross sectional view of a principal part explaining Example 3 of a display device according to the present invention. In Example 3, the crystalline layer CRZ is formed in the surface of the adhesive layer FT of the sealing frame FR except each contact surface of the first glass substrate SUB1 and the sealing frame FR, as well as of the second glass substrate SUB2 and the sealing frame FR. This example is a structure suitable for display devices designed to seal a gas inside the airtight container, e.g., a plasma display device.

That is, Example 3 is suitable for sealing in the case where the interior of the airtight container is not in a highly low-pressure atmosphere like the vacuum state of Example 1 or Example 2. For this reason, although it is not necessary to interpose the adhesive layer FT between the respective contact surfaces of the first glass substrate SUB1 and sealing frame FR, as well as of the second glass substrate SUB2 and sealing frame FR, in Example 3 the adhesive layer FT of an extremely thin layer is interposed between the respective contact surfaces.

Then, the crystalline layer CRZ is formed in the surface of the adhesive layer FT facing to the interior of the display region AR side and in the surface of the adhesive layer FT facing to the outside. Then, in this case, the crystalline layer CRZ is formed on the both sides of the sealing frame FR by heating and solidifying the adhesive layer FT at one time in reduction atmosphere.

According to Example 3, a decrease in the adhesive strength due to the degradation of the adhesive layer due to the affect of moisture outside the airtight container, as well as due to a sealing gas inside the airtight container is suppressed, thereby allowing a highly reliable display device to be provided.

Figure 5:
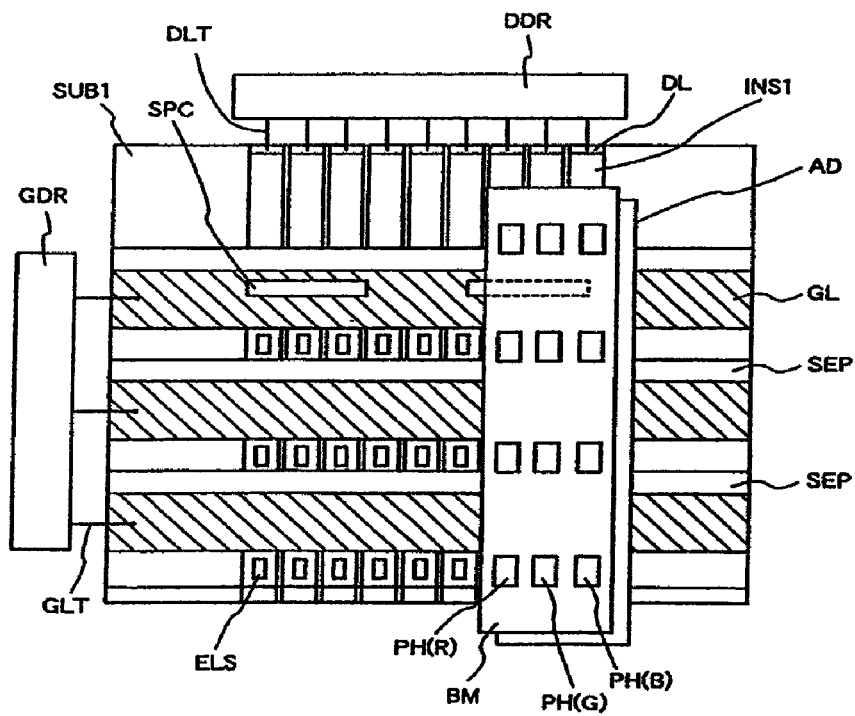
FIG. 5 is a schematic top view explaining a specific structure of a display device using an MIM type thin film electron source as an example of a display device of the present invention.

FIG. 5 is a schematic top view explaining a specific structure of a display device using an MIM type thin film electron source as an example of a display device of the present invention. In addition, while FIG. 5 primarily shows a plane of the first glass substrate SUB1 having the electron source, it partially shows a black matrix BM, fluorescent substances PH (R), PH (G), and PH (B), and an anode AD which the second glass substrate SUB2, in which the fluorescent substances, anodes, and the like are formed, has, but the second glass substrate SUB2 itself is not illustrated.

In the first glass substrate SUB1, there are formed a signal line DL connected to the signal line driving circuit DDR, a scanning line GL connected to the scanning line driving circuit GDR, the scanning line GL being insulated from the signal line DL by an insulating film INS1 and being crisscross-arranged thereto, and the like. A plurality of electron sources ELS (i.e., cathodes), the electron source consisting of the signal line DL serving as a first electrode, and a thin film electrode of the scanning line GL serving as a second electrode, the thin film electrode being laminated via a tunneling insulating film, are arranged as an electron source array. In addition, reference numeral DLT represents a lead terminal of the signal line DL, and reference numeral GLT represents a lead terminal of the scanning line GL, respectively.

The fluorescent substances PH (R), PH (G), and PH (B), which the second glass substrate SUB2 has, face to the individual cathode ELS of the back substrate SUB1. The gap between the second glass substrate SUB2 and the first glass substrate SUB1 is controlled to maintain a predetermined gap by the spacer SPC. The thin film electrode (upper electrode of the cathode ELS) is electrically isolated from the scanning line of the adjacent electron source array by a separating part SEP. The structure described in the above Example 1 or Example 2 is applied for bonding and fixing the first glass substrate SUB1, second glass substrate SUB2, and sealing frame FR of this image display device.

Example 4

This is another example of a glass used for a bonding adhesive-layer. Bonding glass adjusted as follows are provided.

Moreover, with the use of these, sealing of the back substrate and front substrate through wirings or bonding to a spacer is carried out to constitute a plane type display device that achieves high-reliability and long life.

That is, the bonding glass of the present invention is adjusted to $V_2O_5$: 25 to 50 wt %, and BaO: 5 to 30 wt % in oxide conversion. Moreover, the bonding glass of the present invention is adjusted to $V_2O_5$: 25 to 50 wt %, BaO: 5 to 30 wt %, $TeO_2$: 20 to 40 wt %, $WO_3$: 1 to 25 wt %, and $P_2O_5$: 0 to 20 wt % in oxide conversion.

Moreover, the bonding glass of the present invention is adjusted to $V_2O_5$: 35 to 45 wt %, BaO: 10 to 20 wt %, $TeO_2$: 20 to 30 wt %, $WO_3$: 5 to 15 wt %, and $P_2O_5$: 0 to 5 wt % in oxide conversion.

Moreover, the bonding glass of the present invention is adjusted to $V_2O_5$: 35 to 45 wt %, BaO: 5 to 20 wt %, $TeO_2$: 20 to 35 wt %, $WO_3$: 1 to 15 wt %, ZnO: 1 to 10 wt %, and $Sb_2O_3$: 1 to 10 wt % in oxide conversion.

Moreover, for the bonding glass of the present invention, 0.5 to 10 wt % of compound selected from the group consisting of SrO, $GeO_2$, $La_2O_3$, $Cr_2O_3$, $Nb_2O_5$, $Y_2O_3$, MgO, $CeO_2$, and $Er_2O_3$ may be further added. Alternatively, 5 to 30 volume % of ceramic filler material may be added to the bonding glass described above. This ceramic filler may be any one of $SiO_2$, $ZrO_2$, $Al_2O_3$, $ZrSiO_4$, zirconium phosphate $((ZrO)_2P_2O_7$, $(ZrO)_2P_2O_7$, $Ca_{0.5}Zr_2(PO_4)_3$, $Zr_2(WO_4)(PO_4)_2)$, cordierite, mullite, and eucryptite.

As for the wiring formed in the back substrate or the front substrate, a lamination layer (e.g., Cr—Al—Cr) of aluminum (Al) or its alloy, copper (Cu) or its alloy, chromium (Cr) or its alloy, and the like, may be used. Particularly, Cr—Al—Cr is suitable as the wiring material provided in the bonding area because Cr's wettability to glass is excellent. In addition, the present invention also contemplates wirings containing Au and Ag.

FIG. 6 and FIG. 6' are views explaining the compositions of $V_2O_5$ system glass of the present invention. FIG. 6 and FIG. 6' list a plurality of glass names: VTW01 to VBW07, and SST-01 to SST-30, in accordance with difference in the content percentage of each composition. Each composition is shown as weight % (wt %) in oxide conversion.

SST-01 to SST-30 are nonlead glass samples adjusted to contain $V_2O_5$: 25 to 50 wt % and BaO: 5 to 30 wt % in oxide conversion, and VTW01 to VTW09 are nonlead glass samples adjusted to $V_2O_5$: 25 to 50 wt %, BaO: 5 to 30 wt %, $TeO_2$: 20 to 40 wt %, $WO_3$: 1 to 25 wt %, and $P_2O_5$: 0 to 20 wt %. Each sample is prepared as follows.

Starting materials are $V_2O_5$ (manufactured by Kojundo Chemical Laboratory Co., Ltd, 99.9% purity), BaO (manufactured by Wako Pure Chemical Industries, Ltd, 99.9% purity), $TeO_2$ (manufactured by Kojundo Chemical Laboratory Co., Ltd, 99.9% purity), $WO_3$ (manufactured by Wako Pure Chemical Industries, Ltd, 99.9% purity), and $P_2O_5$ (manufactured by Kojundo Chemical Laboratory Co., Ltd, 99.9% purity). In order to prepare the V system glass base material, each raw material is first mixed in weight ratio as shown in FIG. 6. In the case where $P_2O_5$ is contained in the raw material, all the raw materials except $P_2O_5$ are mixed in advance. This is for preventing $P_2O_5$ from being left in the atmosphere for a long time because it is highly hygroscopic. Mixed powder except $P_2O_5$ is put into an alumina crucible, and the whole alumina crucible is put on a balance and a specified quantity of $P_2O_5$ is weighed and at the same time is mixed using a metal spoon. At this time, in order to avoid moisture absorption from the atmosphere, mixing using a mortar or a ball mill is not carried out.

The alumina crucible containing the above-described powder mixture of raw materials is set in a glass furnace, and heating is started. Heating rate is set to 5° C./min, and the temperature is held for 1 hour after reaching the target temperature. In this example, the target temperature is fixed to 1000° C. The melting glass is held for 1 hour while agitating, and the alumina crucible will be removed from the furnace after being held, and be cast into a graphite mold which is heated to 300° C. in advance. The glass cast into the graphite mold is moved to a stress relief furnace that is heated to a stress relieve temperature in advance, and the stress is removed by keeping for 1 hour, and thereafter the glass cast is cooled down to room temperature at cooling rate of 1° C./min after removing stress by keeping for 1 hour. The obtained glass has a size of 30 mm×40 mm×80 mm. The obtained glass block is cut into a size of 4 mm×4 mm×15 mm, and the thermal expansion coefficient, electric resistivity, and density are evaluated. The remaining glass after taking out the block is ground and used as powder samples used for DTA analysis (differential thermal analysis) for evaluating the glass characteristic temperature and for a button flow test.

Figures 7, 8:
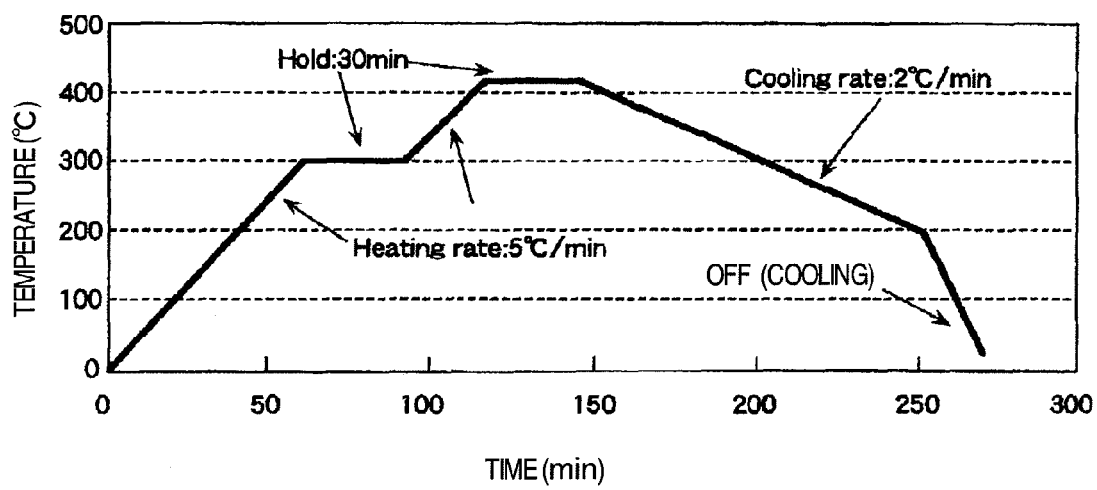
FIG. 7 is an explanatory view of a temperature profile of a so-called button flow test.
FIG. 8 is a view explaining a characteristic table of frit made by mixing ZWP filler into VBW03.

FIG. 7 is an explanatory view of the temperature profile of a so-called button flow test. The button flow test is a test wherein glass powders formed in a button shape are placed on a glass substrate in which insulating film and metal film (wiring or the like) are formed, and this is heated and cooled to observe the wettability and reactivity to the underlying insulating film and metal film, whether or not crack occurred, how many air bubbles occurred due to gas, and the like. This temperature profile is shown in FIG. 7. That is, the button-shaped sample glass is placed on the glass substrate in which the insulating film and metal film (wiring or the like) are formed at normal temperature, and this is ramped up at 5° C./min and is held at 420° C. for 30 minutes. After that, the sample glass is ramped down to 200° C. at 2° C./min and is left to be cooled down to room temperature.

Tests concerning the glass shown in FIG. 6 were carried out in the following procedures.

In this example, a cylindrical glass powder compact with 10 mm in diameter and 5 mm in height is placed on a soda lime glass, and the tests were carried out by heat-treating. In this test, if the button diameter (referred to as the fluid diameter) after the heat treatment is 15 mm or more, it is determined that the wettability to the sealed material is good.

As a result of such test, in the case of conditions where the sealing is carried out at 420° C., it is revealed that VTW04 is most excellent among the VTW series glass. As a result of further detailed study, the characteristic temperature of the compositions around VTW04, i.e., the glass adjusted to the region of $V_2O_5$: 35 to 45 wt %, BaO: 10 to 20 wt %, $TeO_2$: 20 to 30 wt %, $WO_3$: 5 to 15 wt %, and $P_2O_5$: 0 to 5 wt % in oxide conversion, is low, and is effective particularly for sealing applications at low temperatures of 450° C. or less. The next test is explained.

The VBW series glass described in FIG. 6 is a series for studying in detail around the composition of VTW04 having the most excellent characteristic in sealing applications among the VTW series glass. VBW01 to VBW07 mean glass samples adjusted to $V_2O_5$: 30 to 45 wt %, BaO: 15 to 30 wt %, $TeO_2$: 20 to 35 wt %, $WO_3$: 5 to 20 wt %, and ZnO: 0 to 10 wt %. As a result of a similar study to the above, it is revealed that VBW03 is most excellent among the VBW series.

The thermal expansion coefficient of the bonding glass of FIG. 6 has to be decreased because the thermal expansion coefficient of the soda lime glass that is the sealed material used in this example is approximately $85 \times 10^{-7}/°$ C. In this example, VBW03 is used as the representative of the glass in FIG. 6, and $Zr_2(WO_4)(PO_4)_2$ (hereinafter, referred to as ZWP) is used as a low expansion filler. The thermal expansion coefficient of ZWP is $-32 \times 10^{-7}/°$ C.

FIG. 8 is a view showing a relationship between the mixed quantity of ZWP filler and the thermal expansion coefficient. In the case where the bonding-glass base material is VBW03, mixing approximately 30 wt % of ZWP filler may adjust the thermal expansion coefficient to the one suitable for bonding applications.

Moreover, as the added substances recommended for adjusting the thermal expansion coefficient and the fluid characteristic without devitrifying a $V_2O_5$—$TeO_2$—$WO_3$—$P_2O_5$ system non-lead glass and a $V_2O_5$—$TeO_2$—$WO_3$—ZnO system nonlead glass, Mgo, $La_2O_3$, $Nb_2O_3$, and $Sb_2O_3$ are listed.

Figure 9:
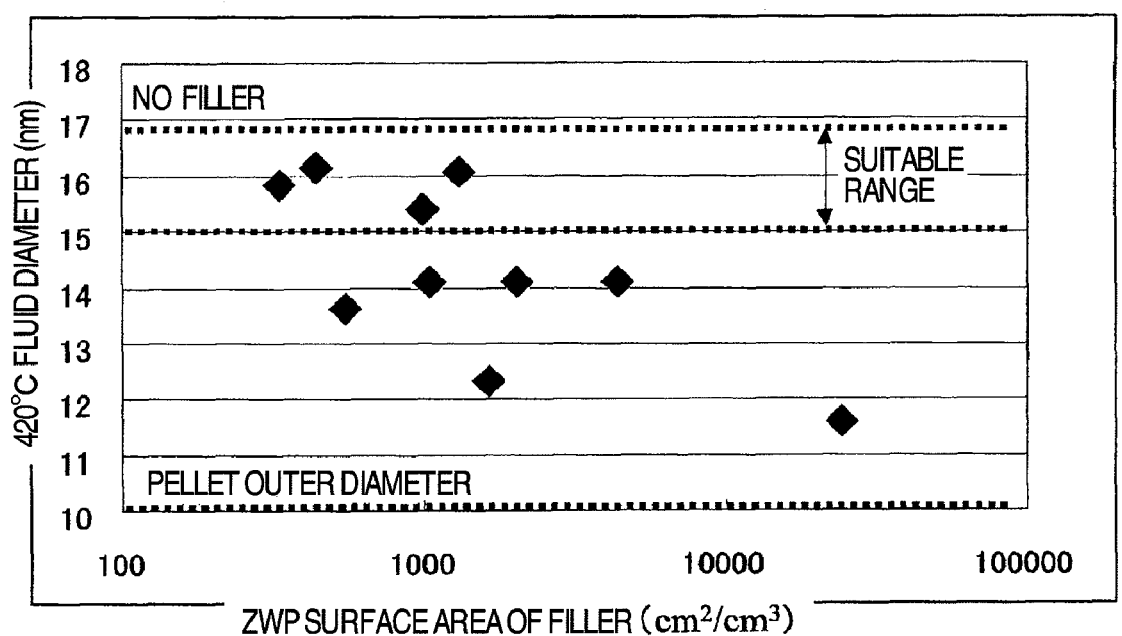
FIG. 9 is a view showing a relationship between the surface area of filler and the fluid diameter.

Fillers of various grain diameters are used and mixed with VBW03 to carry out a similar button flow test. FIG. 9 is a view showing a correlation between the total surface area of the mixed filler and the fluid diameter at 420° C. This result indicates that the larger the grain diameter of the filler and the fewer the mixed quantity, the more excellent the flowability of frit becomes.

As a result of this button flow test, in the joint for sealing and forming the vacuum container of a flat type display of this example, a frit of VBW03+30 wt % of ZWP is used.

Figure 10:
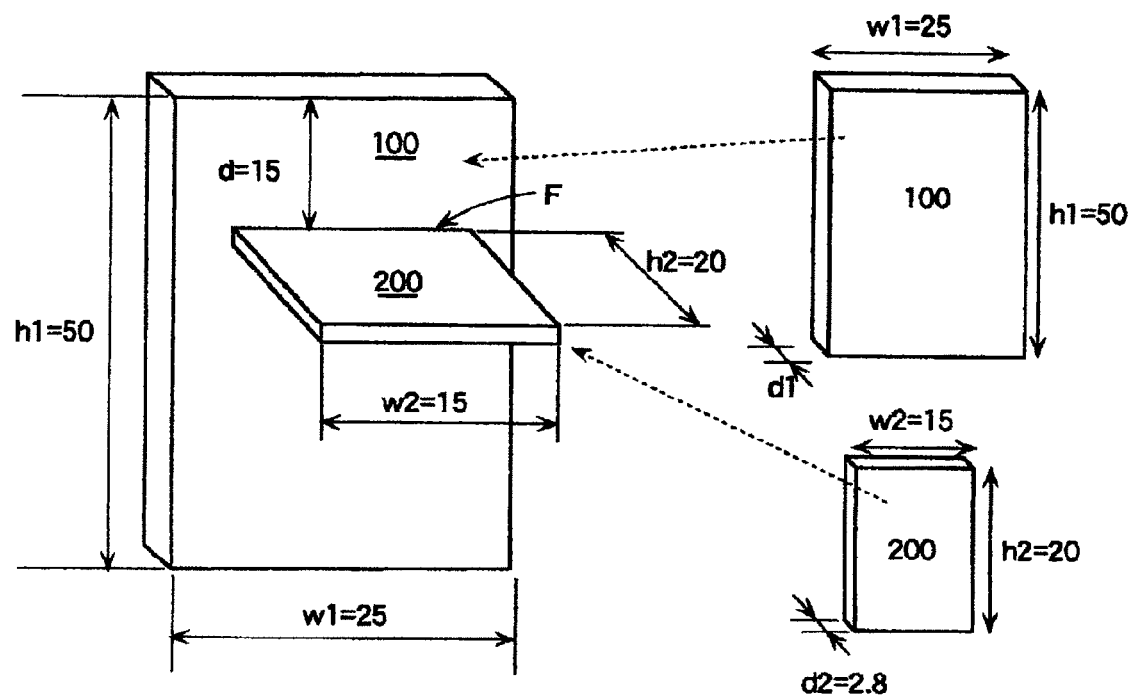
FIG. 10 is an explanatory view of a bonding-glass strength evaluation test piece bonded using a frit glass.
Figure 11:
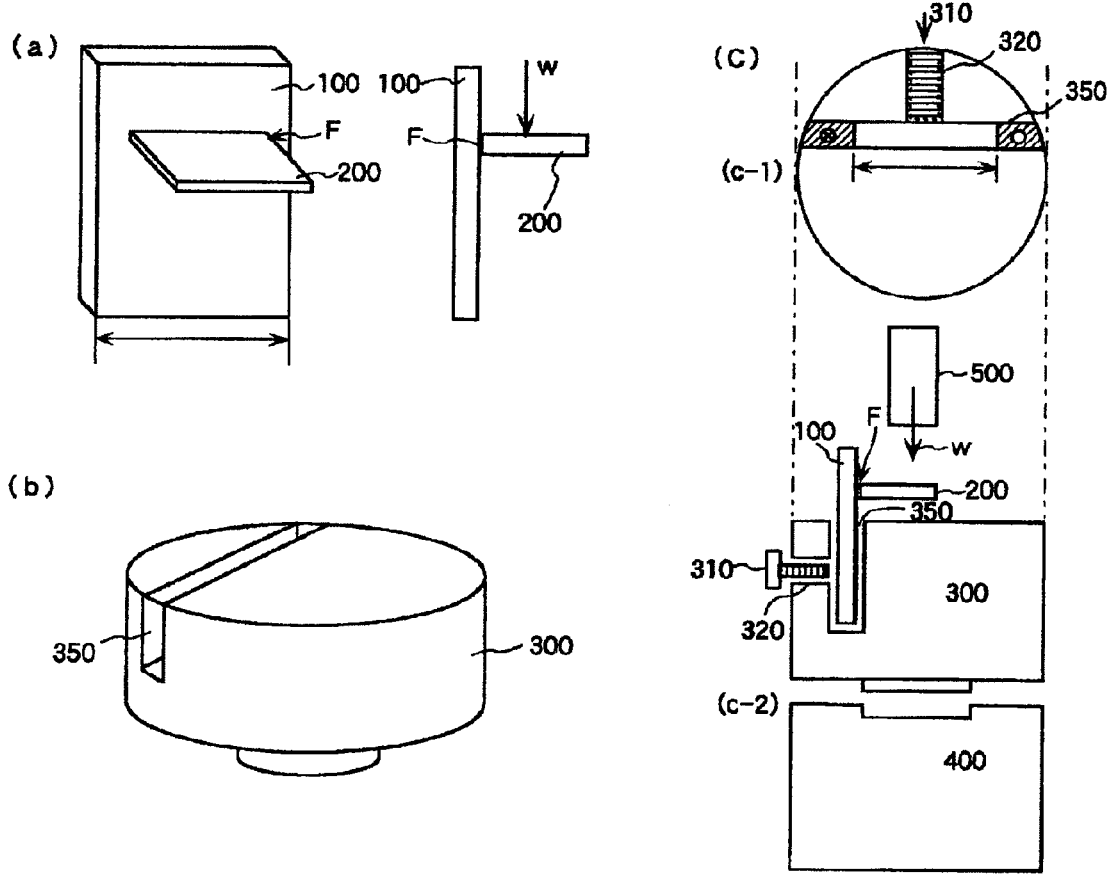
FIG. 11 is an explanatory view of the strength evaluation using the bonding-glass evaluation test piece of FIG. 10.

FIG. 10 is an explanatory view of a bonding-glass evaluation test piece that is bonded using the frit of VBW03+30 wt % of ZWP. Moreover, FIG. 11 is an explanatory view of the strength evaluation using the bonding-glass evaluation test piece of FIG. 10. As shown in FIG. 10, the bonding-glass evaluation test piece is constituted bonding a first component 100 of a size (width w1, w2, height h1, h2, and thickness of d1, d2) as shown in FIG. 10 to a second component 200 in a T-shape by means of a bonding glass F of the present invention. The dimensions of the T-shaped joint are w1=25 mm, w2=15 mm, h1=50 mm, h2=20 mm, and the thickness of d1=2.8 mm, and d2=2.8 mm, as illustrated.

As shown in FIG. 11, one end of the first component 100 of the bonding-glass evaluation test piece of FIG. 11 (a) described in FIG. 10 is inserted in a groove 350 of a sample fixing jig 300 of FIG. 11 (b). As shown in FIG. 11 (c), the first component 100 is fixed screwing a screw 310 in a tapped hole 320. The sample fixing jig 300 is fixed to a fixing stage 400. (c-1) of FIG. 11 (c) is a top view and (c-2) of FIG. 11 (c) is a side view.

To the bonding-glass evaluation test piece fixed to the jig in this manner, a load W is applied pressing a pressing tool 500 against the second component 200, as shown in FIG. 11 (a) and FIG. 11(c). This load W is increased gradually, and the load W at the time when the joining area made of VBW03+30 wt % of ZWP bonding glass F broke is measured.

As a result of the measurement, the bond strength of the test piece prepared at bonding temperature in the range of 380° C. to 450° C. is 30 to 60 MPa, and for those using VBW03+30 wt % of ZWP bonding glass in the above bonding glass evaluation, a strength sufficient to constitute a vacuum container of a flat type display device and to maintain this for a long period of time was obtained. Moreover, because the above bonding glass is a nonlead glass, even if wirings exist in the underlying layer of the bonding glass, it will not corrode the wirings, and also it is less likely to produces cracks or air bubbles in the insulating film and wirings, and is therefore an extremely effective sealing material.

As a result of conducting a similar bond strength test with respect to the other VTW series and VBW series, bond strength values equivalent to VBW03+30 wt % of ZWP were obtained by adjusting the thermal expansion coefficient.

Moreover, as a result of carrying out a similar study also with respect to the glass shown in FIG. 6', O is put to those having good bondability and X is put to those having poor bondability. The glass described in FIG. 6' has the compounding ratio that does not contain $TeO_2$, and the glass transition temperature is higher than the glass that contains $TeO_2$. The glass that contains $TeO_2$ is suitable for low temperature bonding, and the glass that does not contain $TeO_2$ is suitable for bonding in a relatively high temperature region.

Accordingly, although even the above bonding glass allows for sufficient bonding, application of a crystalline layer like in other examples may prevent the degradation of the adhesive strength.

In addition, although in the above examples, structures using MIM for the electron source are taken as an example, the present invention is not limited thereto, and may be applicable similarly to flat plane type display devices using the above-described various kinds of electron sources.

It should be further understood by those skilled in the art that although the foregoing description has been made on embodiments of the invention, the invention is not limited thereto and various changes and modifications may be made without departing from the spirit of the invention and the scope of the appended claims.

ADVANTAGES OF THE INVENTION

According to the present invention, a sufficient adhesive strength between the first glass substrate, the second glass substrate, and the sealing frame is secured. Moreover, a decrease in the adhesive strength due to the degradation of the adhesive layer by the affect of moisture outside the airtight container is suppressed, thereby allowing a highly reliable display device to be provided.

The invention claimed is:

1. A bonding glass containing $V_2O_5$: 25 to 50 wt %, $TeO_2$: 20 to 40 wt %, BaO: 5 to 30 wt %, $WO_3$: 1 to 25 wt %, and $P_2O_5$: 0 to 20 wt %, and not containing lead.

2. The bonding glass according to claim 1, containing $V_2O_5$: 35 to 45 wt %, BaO: 10 to 20 wt %, $TeO_2$: 20 to 30 wt %, $WO_3$: 5 to 15 wt %, and $P_2O_5$: 0 to 5 wt %.

3. The bonding glass according to claim 1, containing 5 to 30 volume % of ceramic filler material.

4. The bonding glass according to claim 3, wherein the ceramic filler material is any one of $SiO_2$, $ZrO_2$, $Al_2O_3$, $ZrSiO_4$, zirconium phosphate (($ZrO)_2P_2O_7$, ($ZrO)_2P_2O_7$, $Ca_{0.5}Zr_2(PO_4)_3$, $Zr_2(WO_4)(PO_4)_2$), cordierite, mullite, and eucryptite, or is a mixture of two or more thereof.

5. The bonding glass according to claim 1, wherein $V_2O_5$, BaO, $TeO_2$ are contained in an amount of 62 wt % or more in total.

6. The bonding glass according to claim 1, wherein $V_2O_5$, BaO, $TeO_2$ are contained in an amount of 75 wt % or more in total.

7. A bonding glass containing $V_2O_5$: 35 to 45 wt %, BaO: 5 to 30 wt %, $TeO_2$: 20 to 35 wt %, $WO_3$: 1 to 15 wt %, ZnO: 1 to 10 wt %, and $Sb_2O_3$: 1 to 10 wt %, and not containing lead.

8. A bonding glass containing $V_2O_5$: 25 to 50 wt %, $TeO_2$: 20 to 40 wt % BaO: 5 to 30 wt %, and 0.5 to 10 wt % of compound selected from the group consisting of SrO, $GeO_2$, $La_2O_3$, $Cr_2O_3$, $Nb_2O_5$, $Y_2O_3$, MgO, $CeO_2$, and $Er_2O_3$, and not containing lead.

* * * * *